United States Patent
Braeumer

(10) Patent No.: US 12,370,636 B2
(45) Date of Patent: Jul. 29, 2025

(54) METHOD OF MANUFACTURING A DISPLAY CABINET

(71) Applicant: Carrier Corporation, Palm Beach Gardens, FL (US)

(72) Inventor: Tino Braeumer, Mainz-Kostheim (DE)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 18/446,756

(22) Filed: Aug. 9, 2023

(65) Prior Publication Data

US 2024/0051073 A1 Feb. 15, 2024

(30) Foreign Application Priority Data

Aug. 9, 2022 (EP) .................................... 22189526

(51) Int. Cl.
*B23P 15/26* (2006.01)
*A47F 3/04* (2006.01)

(52) U.S. Cl.
CPC ............ *B23P 15/26* (2013.01); *A47F 3/0439* (2013.01)

(58) Field of Classification Search
CPC ...... B23P 15/26; A47F 3/0439; A47F 3/0447; A47F 3/0482; F25D 19/00; F25D 23/006
See application file for complete search history.

(56) References Cited

U.S. PATENT DOCUMENTS

| 2004/0134221 | A1 | 7/2004 | Fee et al. |
| 2019/0226749 | A1 | 7/2019 | Lee |
| 2021/0106150 | A1* | 4/2021 | Berents ................ A47F 7/0071 |
| 2023/0263317 | A1* | 8/2023 | Zaki ...................... A47F 3/0408 |
| | | | 454/183 |
| 2024/0074600 | A1* | 3/2024 | Visconti ................. F25D 17/06 |

FOREIGN PATENT DOCUMENTS

| WO | 2011060503 A1 | 5/2011 |
| WO | 2016039637 A1 | 3/2016 |

OTHER PUBLICATIONS

European Search Report for Application No. 22189526.1, Issued Feb. 3, 2023, 7 Pages.

* cited by examiner

*Primary Examiner* — Moshe Wilensky
(74) *Attorney, Agent, or Firm* — CANTOR COLBURN LLP

(57) ABSTRACT

A method of manufacturing a display cabinet for a refrigerated display, comprising: assembling a cabinet frame configured to have a refrigeration component installed at either of both a rear portion and a base portion of the cabinet frame; selecting from both the rear portion and the base portion either the rear portion or the base portion of the cabinet frame for installation of the refrigeration component and installing the refrigeration component in the selected portion.

8 Claims, 3 Drawing Sheets

METHOD OF MANUFACTURING A DISPLAY CABINET

CROSS REFERENCE TO RELATED APPLICATIONS

This application claims priority to European Patent Application No. 22189526.1 filed on Aug. 9, 2022 which is incorporated by reference herein in its entirety.

BACKGROUND

The invention relates to a method of manufacturing a display cabinet for a refrigerated display, and a cabinet frame.

Display cabinets are typically used in stores, supermarkets and the like to display products that require or benefit from temperature regulation. Different refrigerated display types will be desirable in different circumstances, and it is therefore necessary to manufacture different types of refrigerated display cabinets to satisfy customer demands.

For example, dependent on the size of the store, display cabinets having a compact form or a larger form may be preferred. For example, a small store, such as a convenience store, may have limited space and therefore may prefer display cabinets having a compact form even if this reduces the number of products that can be stored per cabinet. Whereas, for a larger store, such as a supermarket or hypermarket where space constraints are less of a concern, a display cabinet being optimised to display a greater number of products to a customer may be preferred even if that increases the floor space occupied by the display cabinet. There are a wide variety of different factors that a customer considers when deciding what sort of display cabinet they want.

A need exists for improving the manufacture of display cabinets to efficiently cater for different customer needs.

BRIEF DESCRIPTION

Viewed from a first aspect, a method of manufacturing a display cabinet for a refrigerated display, comprises: assembling a cabinet frame configured to have a refrigeration component installed at either of both a rear portion and a base portion of the cabinet frame; selecting from both the rear portion and the base portion either the rear portion or the base portion of the cabinet frame for installation of the refrigeration component; and installing the refrigeration component in the selected portion.

According to a second aspect of the invention there is provided a cabinet frame configured to be used in the method as described above with reference to the first aspect of the invention.

According to another aspect of the invention, there is provided a plurality of display cabinets of different types, the cabinet frames of each display cabinet being identical. Each display cabinet may be manufactured according the method as described herein with reference to the first aspect of the invention, and may comprise a cabinet frame as described herein with reference to the second aspect of the invention.

According to another aspect of the invention, there is provided a method of manufacturing different types of display cabinets, the method comprising assembling a plurality of identical cabinet frames, and installing refrigeration components in different locations in the different cabinet frames to thereby manufacture the different types of display cabinets. The method may comprise the features described herein with reference to any aspect of the invention.

According to another aspect of the invention there is provided a method of using the same type of cabinet frame for the manufacture of different types of display cabinets. The method may comprise the features described herein with reference to any aspect of the invention.

BRIEF DESCRIPTION OF THE DRAWINGS

Embodiments of the invention will now be described in greater detail, by way of example only and with reference to the following figures, in which.

DETAILED DESCRIPTION

Figure 1:
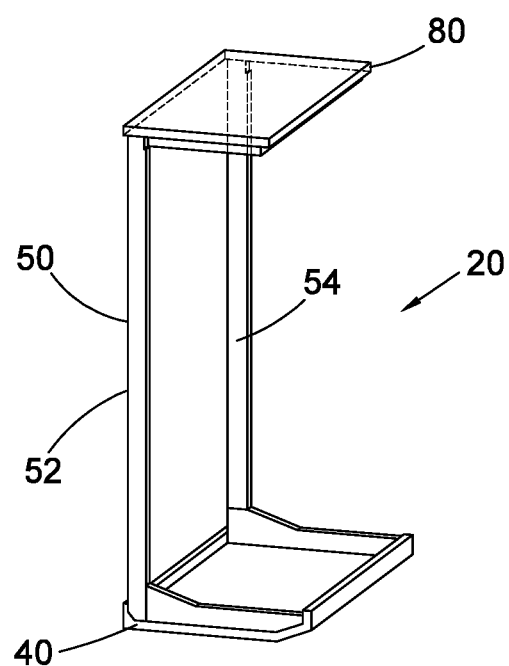
FIG. 1 shows a cabinet frame for a display cabinet.

Viewed from a first aspect, a method of manufacturing a display cabinet for a refrigerated display, comprises: assembling a cabinet frame configured to have a refrigeration component installed at either of both a rear portion and a base portion of the cabinet frame; selecting from both the rear portion and the base portion either the rear portion or the base portion of the cabinet frame for installation of the refrigeration component; and installing the refrigeration component in the selected portion.

Thus, a single cabinet frame can be used to manufacture different types of display cabinets depending on what the desired end-product is. The method may therefore comprise choosing one of two locations in which to install the refrigeration component based upon which type of display cabinet is required to be manufactured. The refrigeration component may be installed in one location within the cabinet frame (e.g. the base portion) to thereby manufacture a first type of display cabinet, or may be installed in the other location (e.g. the rear portion) to thereby manufacture a second type of display cabinet. Thus, only one type of cabinet frame is required for the manufacture of two different types of display cabinets, and the two different types of display cabinets are manufactured by selecting which one of two positions in the cabinet frame to install the refrigeration component. Thus, manufacturing efficiency may be increased, and/or a wider variety of products may be offered to customers without increasing the number of parts required.

Additionally, a display cabinet manufactured according to the first type of display cabinet may be later reconfigured to the second type of display cabinet if necessary (e.g. by moving the refrigeration component) as the cabinet frame remains the same. Likewise, a display cabinet manufactured according to the second type of display cabinet may be later reconfigured to the first type of display cabinet if necessary as the cabinet frame remains the same.

Thus, the cabinet frame is configured to have installed therein the same type of refrigeration component in either the rear portion or the base portion. For example, in the case where the refrigeration component is a heat-absorbing heat exchanger such as an evaporator, the cabinet frame is configured to have the evaporator installed at either of both the rear portion and the base portion of the cabinet frame.

The installation of the refrigeration component in the base portion of the cabinet frame (e.g. to make the first type of display cabinet) may reduce the floor projection of the display cabinet (i.e. the shape or outline of the display cabinet as projected upon a horizontal plane) compared to that of the second type of display cabinet. A floor projection may be considered the area occupied by the display cabinet when viewed from a top down view. A floor projection may be considered equivalent to the plan view area of the display cabinet.

While the installation of the refrigeration component in the base portion may reduce floor projection, it may also reduce the volume of usable space for refrigerated products within the display cabinet. However, it may be advantageous for stores which have limited floor space as they may be able to fit the first type of display cabinet more easily. Thus, the selection of the location of the refrigeration component may be a compromise between storage space and overall cabinet size.

The installation of the refrigeration component in the rear portion of the cabinet frame (e.g. to make the second type of refrigerated display) may increase (or at least may not reduce) the volume of usable space for refrigerated products (compared to that of the first type of display cabinet) as the refrigeration component is not occupying internal space in the base portion of the cabinet frame. However, to provide a greater volume of storage space for refrigerated goods (for a given cabinet frame), it may be necessary to increase the floor projection of the display cabinet. This may be advantageous for stores which do not have significant floor space constraints as they can present a greater number of refrigerated products to customers. Thus, the first type of display cabinet may have a smaller floor projection than that of the second type of display cabinet.

The installation of the refrigeration component in the rear portion of the cabinet frame (e.g. to make the second type of refrigerated display) may increase the floor projection but the area of the cabinet frame in contact with the floor, i.e. the footprint or actual contact area with the floor, may remain the same.

Since the cabinet frame is configured to have the refrigeration component installed in either of both the rear portion or the base portion, it may comprise connection points (e.g. holes, couplings, mountings or the like) that remain unused depending upon which of the rear portion and the base portion are selected. For example, the cabinet frame may comprise connection points for mounting the refrigeration component at the base portion, which connection points may remain unused in the event that the rear portion is selected for installation of the refrigeration component. Similarly, the rear portion may comprise connection points that do not get used in the event that the base portion is selected for installation of the refrigeration component.

The cabinet frame may comprise a base plate. The base plate may be configured to provide support. The cabinet frame may be self-standing via the base plate. The cabinet frame may comprise a rear structure. The rear structure may be configured to extend from the base plate vertically from an edge of the base plate. The cabinet frame may comprise a ceiling plate. The ceiling plate may be configured to extend from the rear structure and over the base plate. One or more of the base plate, rear structure and ceiling plate may be configured to have attached thereto doors, air curtain components, side walls and/or rear walls.

The rear structure may comprise two corresponding vertical struts. The two vertical struts may comprise means for attaching a rear wall, or a rear housing thereto. The two vertical struts may comprise means for attaching the base plate thereto. The two vertical struts may comprise means for attaching the ceiling plate thereto.

The base plate may define the footprint of the display cabinet. The cabinet frame may comprise the same base plate when either of the rear portion or base portion is selected for installation of the refrigeration component. Therefore, the footprint of the display cabinet of the first type and the second type may be the same.

The rear structure may be within the rear portion of the cabinet frame. The base plate may be within the base portion of the cabinet frame. The ceiling structure may be in an upper portion of the cabinet frame. Installing the refrigeration component in the base portion may comprise attaching it to the base plate. Installing the refrigeration component in the rear portion may comprise attaching a rear housing for the refrigeration component to the rear structure. Installing the refrigeration component in the rear portion may comprise attaching the refrigeration component to the rear housing. Installing the refrigeration component in the rear portion may comprise attaching the rear housing, with the refrigeration component attached to the rear housing, to the rear structure.

Installing the refrigeration component in the selected portion may comprise only installing the refrigeration component in the selected portion. Put simply then, the rear portion and the base portion may be different to one another. The base portion and the rear portion may not overlap with each other, and may be distinct from one another. The refrigeration component therefore may be installed in one or the other of the base portion and the rear portion, but not in both the rear portion and the base portion. Thus, it is necessary to select either the rear portion or the base portion for installation of the refrigeration component, but not both.

The assembly of the cabinet frame may be agnostic to the selection of the rear portion or the base portion of the cabinet frame for installation of the refrigeration component. In other words, the cabinet frame is assembled in the same manner and to the same design regardless of the subsequently selected and later installed position of the refrigeration component.

Selection of the rear portion or the base portion of the cabinet frame for installation of the refrigeration component may be based on the floor projection of the required display cabinet. For example, selection of one option over the other may depend on the required floor projection of the display cabinet.

A display cabinet with a smaller floor projection may be more applicable to a greater number of stores as it requires a smaller area for it to be accommodated within. A display cabinet with a greater floor projection may provide a larger refrigerated display volume therein. For example, a display cabinet with a greater floor projection may be able to store a greater number of products therein.

The rear portion of the cabinet frame may be selected for installation of the refrigeration component if the required floor projection (e.g. of the resulting display cabinet) is larger; and the base portion of the cabinet frame may be selected for installation of the refrigeration component if the required floor projection is smaller.

The method may comprise selecting the rear portion or base portion on the basis of the floor projection of the display cabinet being manufactured thereby. Thus, the method may comprise selecting the base portion for installation of the refrigeration component to thereby obtain a smaller floor projection of the resulting display cabinet, or selecting the rear portion for installation of the refrigeration component to thereby obtain a larger floor projection of the display cabinet. Thus, either the rear portion or the base portion may be selected based on the desired size (e.g. floor projection, or storage volume) of the display cabinet being manufactured. The refrigeration component may be installed in the base portion if a smaller size is needed (e.g. at the cost of storage volume), and the refrigeration component may be installed in the rear portion if a larger size is acceptable (e.g. for the additional storage volume that results). It is therefore possible to tailor to the size of the display cabinet, for a given cabinet frame.

An available floor projection may be considered small if the floor projection of the display cabinet is required to be minimised. For example, in a small store, it may be desirable to minimise the occupied floor space of the display cabinet to either increase the number of cabinets that can be installed within the store, and/or to increase the available space of the aisles for customers to occupy.

An available floor projection may be considered large if the floor projection of the display cabinet is not required to be minimised. For example, in a large store, it may be more desirable to maximise the refrigerated space available in each display cabinet hence reducing the number of cabinets required to store products.

The method may comprise selecting the rear portion or the base portion of the cabinet frame for installation of the refrigeration component based on a height requirement of a lip of the display cabinet.

When the refrigeration component (e.g. an evaporator unit with a fan) is installed in the base portion, a raised front lip may also be provided in order to ensure the appropriate airflow in the display cabinet. The raised front lip may not be required in the event that the refrigeration component is installed in the rear portion of the cabinet frame. The method may therefore comprise selecting the rear portion for installation of the refrigeration component to thereby allow a lower front lip to be used than would be required if the refrigeration component was installed in the base portion.

The lip may be attached to the base plate. The lip may be configured to ensure appropriate airflow in the display cabinet e.g. by redirecting chilled air blown by the refrigeration component. The lip may protect/shield the refrigeration component.

The method may comprise selecting the rear portion of the cabinet frame for installation of the refrigeration component if the height requirement of the lip is lower; and otherwise selecting the base portion for installation of the refrigeration component if the height requirement of the lip is higher, or if the height requirement is not low.

Where vertical access to products stored within the display cabinet is to be maximised the rear portion may be selected for installation of the refrigeration component such that space at the base portion of the cabinet frame is not taken up by the refrigeration component and can instead be used to store products.

The selection of the rear portion or the base portion of the cabinet frame for installation of the refrigeration component may be based on the vertical access requirements of the display cabinet.

Selecting the rear portion or the base portion of the cabinet frame for installation of the refrigeration component may be based on cleaning considerations.

For example, selecting the rear portion of the cabinet frame for installation of the refrigeration component may advantageously avoid leaking products or the like stored within the display cabinet from fouling the refrigeration component as gravity draws the leak downwards through the cabinet. Selecting the rear portion of the cabinet frame for installation of the refrigeration component may provide a display cabinet and/or refrigeration component that is easier to clean and/or more hygienic. For example, having an evaporator in the rear portion may collect less dirt and may be easier to clean than if it were in the base portion. For example, due to its location, an evaporator in the base portion may be contaminated by leaking goods, or any other detritus that might otherwise foul the bottom of the display cabinet.

Installing the refrigeration component in the selected position may comprise installing a refrigeration unit as a modular unit.

The modular unit may comprise a rear housing configured to have the refrigeration component mounted thereto. The rear housing may be configured to have a plurality of refrigeration components mounted thereto. The method may therefore comprise mounting the refrigeration component(s) to the rear housing and subsequently mounting the rear housing to the cabinet frame, to thereby install the refrigeration component(s) at the rear portion. The rear housing may therefore provide a 'backpack' into which the refrigeration component(s) may be installed e.g. prior to the backpack being mounted to the cabinet frame.

Alternatively, the rear housing may be mounted to the cabinet frame, and the refrigeration component(s) may subsequently be mounted therein.

The rear housing may comprise a protrusion (e.g. a hump) into which the refrigeration component(s) may be mounted. The provision of the protrusion in the second type of display cabinet may therefore increase the volume within the display cabinet available for chilled goods, compared to the volume available in the first type of display cabinet. The protrusion may therefore increase the projection of the display cabinet without increasing its footprint. The rear housing may comprise a plenum (e.g. within the protrusion) for example for airflow within the display cabinet.

The refrigeration unit may be installed as a single unit. That is, the components forming the refrigeration unit may be installed and removed as one unit in to or out of the cabinet frame. The refrigeration unit may comprise a plurality of refrigeration components.

Advantageously, the refrigeration unit being installed as a modular unit allows for malfunctioning units to be replaced with ease without requiring the entire cabinet being replaced or sent for repair. Thus, the second type of display cabinet may be easier to perform maintenance on that the first type of display cabinet.

The method may comprise installing a plurality of refrigeration components in the selected rear portion or base portion. The plurality of refrigeration components may be installed only in the selected rear portion or base portion. For example, if the base portion is selected, the plurality of refrigeration components may be installed only in the base portion in which case none of the plurality of refrigeration components are installed in the rear portion. Alternatively, if the rear portion is selected, the plurality of refrigeration components may be installed only in the rear portion in which case none of the plurality of refrigeration components are installed in the base portion.

The refrigeration component may be any component of a refrigeration cycle. The refrigeration component may be a heat exchanger e.g. an evaporator. The refrigeration component may be a blower unit (e.g. comprising a fan). The refrigeration component may be an evaporator sensor. The method may comprise installing a heat exchanger (e.g. a heat-absorbing heat exchanger, such as an evaporator or the like). The method may comprise installing a blower unit (e.g. a fan or fan unit) configured to circulate air flow over the heat exchanger and throughout the display cabinet. The method may comprise installing a sensor (e.g. an evaporator sensor). The refrigeration components may all be installed simultaneously (e.g. as a modular unit, for example within the rear housing), or they may be installed in series.

Where the display cabinet is to be of the standalone type (otherwise known as a plug-in cabinet), the method may comprise installing a plurality of refrigeration components required for a complete refrigeration cycle to take place. The refrigeration components may comprise a heat absorbing heat exchanger, compressor, heat rejection heat exchanger and an expansion device. The display cabinet may only additionally require an electricity supply to operate.

Where the display cabinet is to be of the remote cabinet type, the method may comprise installing a plurality of refrigeration components required to partially complete a refrigeration cycle. The refrigeration components may comprise a heat absorption heat exchanger, a blower unit and connections configured to input and output refrigerant from a refrigerant supply or coolant from a coolant supply. Where the display cabinet is of the remote cabinet type, the refrigeration component may not comprise a heat rejection heat exchanger or compressor.

The method may comprise selecting the rear portion of the cabinet frame for installation of the refrigeration component, and attaching the rear housing to the cabinet frame, for housing the refrigeration component.

The refrigeration component may be mounted in the rear housing such that the refrigeration component extends outwardly from the cabinet frame. The method may comprise mounting the refrigeration component within the rear housing prior to attaching the rear housing to the cabinet frame, to thereby install the refrigeration component by attachment of the rear housing.

The method may comprise mounting the refrigeration component within the rear housing after attaching the rear housing to the cabinet frame, to thereby install the refrigeration component by attachment of the rear housing.

When the refrigeration component is mounted in the rear housing the floor projection of the display cabinet may be considered to include the area occupied by the cabinet frame and the area occupied by the rear housing when viewed from above. That is, whilst it may be that only the cabinet frame contacts the floor, the floor projection is also considered to include the area occupied by the rear housing when viewed from above. In short, the protrusion of the rear housing may increase the floor projection.

The method may comprise selecting the base portion of the cabinet frame for installation of the refrigeration component, and attaching the refrigeration component to a base plate of the cabinet frame. The refrigeration component may therefore be within the space bounded by the cabinet frame, e.g. it may extend inwardly from the cabinet frame. This may contrast with the second type of display cabinet in which the refrigeration component may occupy e.g. the protrusion of the rear housing, and therefore may be disposed outside of the envelope of space bounded the cabinet frame. In the first type of display cabinet, the extension of the refrigeration component into the volume within the cabinet frame may therefore reduce (compared to the second type of display cabinet) the volume available for chilled goods in the first type of display cabinet.

The method may comprise installing a wall at the rear portion of the cabinet frame. The wall may be formed of a thermally insulating material. The wall may close off the rear portion of the cabinet frame. The wall may be configured to direct and distribute cooling air from the refrigeration component to within the display cabinet. The wall may be planar, or substantially planar. The wall may prevent installation of a refrigeration component at the rear portion of the cabinet frame e.g. the wall may be installed instead of a refrigeration component in the rear portion.

The rear housing may be formed of a thermally insulating material. The rear housing may close off the rear portion of the cabinet frame. The rear housing may be configured to direct and distribute cooling air from the refrigeration component to within the display cabinet. The rear housing may prevent installation of the wall, so that either the wall, or the rear housing is installed to the cabinet frame, but not both.

The cabinet frame may be a first cabinet frame, and the refrigeration component may be a first refrigeration component, the method may comprise assembling a second cabinet frame to the same design as the first cabinet frame, the second cabinet frame being configured to have a refrigeration component installed at either of both a rear portion and a base portion of the second cabinet frame; selecting from both the rear portion and the base portion of the second cabinet frame the portion not selected for the first cabinet frame for installation of the first refrigeration component; and installing the second refrigeration component in the second cabinet frames in the selected portion.

The method may comprise assembling a plurality of identical cabinet frames, each being configured to have a (respective) refrigeration component installed in either of two locations. The method may comprise selecting a first location (e.g. the base portion) of the first cabinet frame for installation of the first refrigeration component, and selecting a second location (e.g. the rear portion) of the second cabinet frame for installation of the second refrigeration component. Thus, the method may comprise using identical cabinet frames to manufacture different types of display cabinet. The method may comprise manufacturing a first type of display cabinet and a second type of display cabinet, both having identical cabinet frames.

Assembling the cabinet frame may comprise assembling a plurality of identical cabinet frames, each of which are suitable for receiving a respective one of a plurality of refrigeration components in either of both a rear portion and a base portion thereof; selecting the rear portion or base portion of the cabinet frame may comprise selecting the rear portion or base portion of each of the plurality of refrigeration cabinet frames for installation of the respective one of the plurality of refrigeration components; installing the refrigeration component may comprise installing each one of the plurality of refrigeration components in the respective selected position of each of the plurality of refrigeration cabinet frames.

A plurality of identical cabinet frames is intended to mean a plurality of cabinet frames to the same design, e.g. same dimensions, shape, mounting points etc. For example, it is not intended to exclude a cabinet frame having minor manufacturing defects and/or typical tolerance differences.

According to a second aspect of the invention there is provided a cabinet frame configured to be used in the method as described above with reference to the first aspect of the invention.

According to another aspect of the invention, there is provided a plurality of display cabinets of different types, the cabinet frames of each display cabinet being identical. Each display cabinet may be manufactured according the method as described herein with reference to the first aspect of the invention, and may comprise a cabinet frame as described herein with reference to the second aspect of the invention.

According to another aspect of the invention, there is provided a method of manufacturing different types of display cabinets, the method comprising assembling a plurality of identical cabinet frames, and installing refrigeration components in different locations in the different cabinet frames to thereby manufacture the different types of display cabinets. The method may comprise the features described herein with reference to any aspect of the invention.

According to another aspect of the invention there is provided a method of using the same type of cabinet frame for the manufacture of different types of display cabinets. The method may comprise the features described herein with reference to any aspect of the invention.

Figure 2:
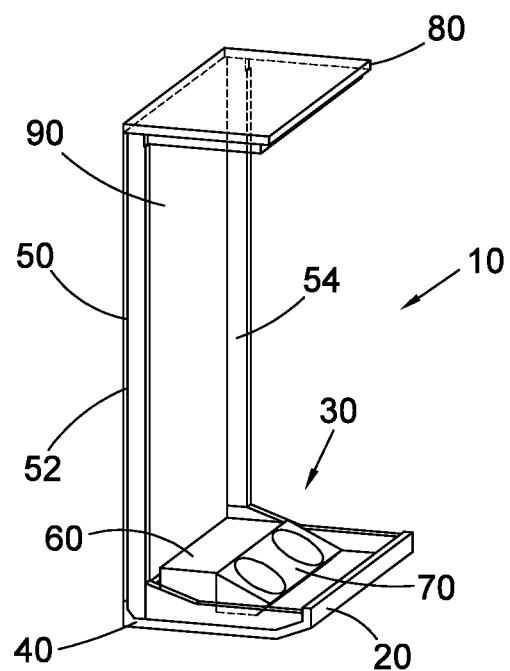
FIG. 2 shows a first type of display cabinet having a refrigeration unit attached to a base portion of the cabinet frame.
Figure 3:
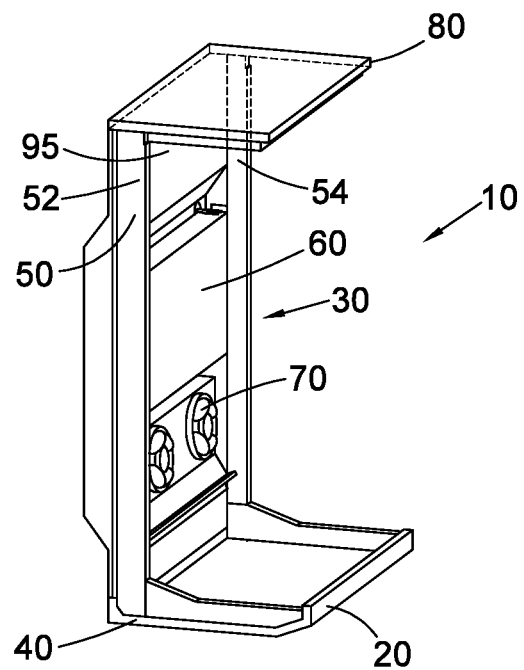
FIG. 3 shows a second type display cabinet having a refrigeration unit attached to a rear portion of the cabinet frame.

With reference to each of FIGS. 1, 2 and 3, a display cabinet 10 includes a cabinet frame 20 and a refrigeration unit 30. The cabinet frame 20 has a base plate 40 and a rear structure 50 extending vertically from one end of the base plate 40. In this case, the rear structure 50 comprises two vertical struts 52, 54. The refrigeration unit 30 includes refrigeration components, in this case a heat exchanger 60 (e.g. a heat-absorbing heat exchanger such as an evaporator) and a blower unit 70.

The refrigeration unit 30 is configured to provide temperature regulation of the display cabinet 10 by passing air through the heat exchanger 60, via the blower unit 70 (e.g. fan unit), such that heat is extracted by the heat exchanger 60 before the air flow enters/re-enters the display cabinet 10. Thus, the refrigeration unit 30 provides a means of reducing the temperature of the interior of the display cabinet 10, the interior of the display cabinet 10 being the volume bounded by the cabinet frame 20 and typically used to store goods requiring low temperature storage.

The cabinet frame 20 in the figures, also comprises a ceiling plate 80 extending over the base plate 40 from an upper end of the rear structure 50. The cabinet frame 20 may, in addition to the base plate 40, rear structure 50 and the ceiling plate 80, also comprise sidewalls extending vertically from the base plate to the ceiling plate 80 and/or doors, air curtains etc. which are not illustrated and are dependent on the specific desired configuration for the installation location of the display cabinet. For example, a row of the cabinet frames 20 may be placed next to one another in a store and hence not require side walls dividing each cabinet frame from one another.

In the figures, the heat exchanger 60 of the refrigeration unit 30 is configured to be connected to an external refrigerant or coolant supply. That is, the heat exchanger 60 is configured to receive low temperature refrigerant or coolant at an input of the heat exchanger and output relatively high temperature refrigerant or coolant back to the refrigerant or coolant supply at an output of the heat exchanger 60. In the case of a refrigerant supply, this is typically facilitated in stores by having the compressor, heat rejection heat exchanger and expansion of the refrigeration cycle at a position remote from the display cabinets such as outside of the store. In the case of a coolant supply, coolant fluid such as such as F-gas refrigerant or CO2 for example may be flowed between the display cabinet and a remote heat exchanger that may be in heat exchanging relationship with a separate refrigeration cycle. Alternatively, each display cabinet may comprise a self-contained refrigeration cycle for cooling the interior thereof.

The base plate 40 and rear structure 50 of the cabinet frame 20 in each of FIGS. 1, 2 and 3 are the same regardless of where the refrigeration unit 30 is or is intended to be installed. That is, the cabinet frame 20 when the refrigeration unit 30 is installed at the base plate 40, i.e. in the base portion of the cabinet frame, as illustrated in FIG. 2 is the same as the cabinet frame 20 when the refrigeration unit 30 is installed at the rear structure 50, i.e. at the rear portion of the cabinet frame, as illustrated in FIG. 3.

In other words, the cabinet frame 20 is designed to be agnostic of the decision as to where the preferred location of the refrigeration unit 30 is to be installed for the particular use of the display cabinet. The cabinet frame 20 is the same in both the first type of display cabinet as shown in FIG. 2, and the second type of display cabinet as show in FIG. 3. Advantageously, this means the cabinet frame 20 can be manufactured proportional to the demand of display cabinets 10 as a whole and not be dependent on specific demand at any one point in time for first type or second type display cabinets. This means that one production line can be operated for both variations or types of display cabinet, thereby enhancing the manufacturing efficiency of the display cabinets. It also means that a display cabinet is reconfigurable if necessary from one variant to the other.

The cabinet frame 20 comprises mounting points in the base plate 40 for installation of the refrigeration unit 30. That is, regardless of where the refrigeration unit 30 is ultimately installed, the cabinet frame 20 has, in the base plate 40, means of receiving the refrigeration unit 30.

The cabinet frame 20 also comprises mounting points in the rear structure 50 for installation of a wall 90 or for installation of a rear housing 95 for the refrigeration components. That is, regardless of where the refrigeration unit 30 is ultimately installed, the cabinet frame 20 has, in the rear structure 50, and in particular in this case struts 52, 54, means for receiving a wall 90 or rear housing 95 to close off the rear portion of the display cabinet 10.

In the first type of display cabinet in FIG. 2, i.e. when the base portion of the cabinet frame 20 is selected for installation of the refrigeration unit 30, the wall 90 is a panel like member intended to close off, e.g. insulate, seal, etc., the rear portion of the cabinet frame 20.

In the second type of display cabinet of FIG. 3, i.e. when the rear portion of the cabinet frame 20 is selected for installation of the refrigeration unit 30, the rear housing 95 is a panel like member intended to close off, e.g. insulate, seal, etc., the rear portion of the cabinet frame 20. The rear housing 95 also comprises a bulged portion (e.g. a protrusion) extending outwardly from the rear portion (when installed), which comprises means for receiving the refrigeration unit 30.

In FIG. 2, the refrigeration components, heat exchanger 60 and blower unit 70, are installed in the base portion of the cabinet frame 20 via the mounting points in the base plate 40 and an insulating wall 90 is installed at the rear portion via the mounting points in the rear structure 50.

In FIG. 3, the refrigeration components, heat exchanger 60 and blower unit 70, are installed at the rear portion via the rear housing 95 being installed via the mounting points in the rear structure 50. In this case, whilst present, the mounting points in the base plate 40 of the cabinet frame are not utilised.

The mounting points in the base plate 40 and rear structure 50 of the cabinet frame 20 are present regardless of the ultimately chosen position of the refrigeration unit 30 and hence allows for the same cabinet frame 20 to be manufactured for both rear mounted or base mounted refrigeration unit 30 display cabinets 10.

Figure 4:
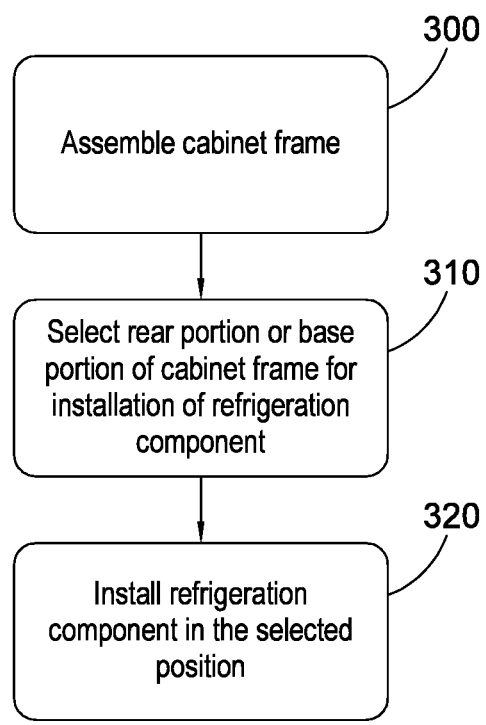
FIG. 4 illustrates a method of manufacturing a display cabinet.

FIG. 4 illustrates a method of manufacturing a display cabinet 10. The method begins with step 300 of assembling a cabinet frame 20. Assembling the cabinet frame 20 may consist of attaching the base plate 40 and the rear structure 50 to one another with fasteners or the like and attaching the ceiling plate 80 and the rear structure 50 to one another with fasteners or the like. The assembled cabinet frame 20 being configured to receive a refrigeration component(s) 60, 70 in either of both of the base plate 40 and rear structure 50.

At step 310 the rear portion or the base portion of the cabinet frame 20 is selected for installation of the refrigeration component(s) 60, 70. The selection may be based on space requirements of the location the display cabinet 10 is intended to be used. Ultimately, the selection is made based on what type of display cabinet 10 is to be manufactured from the cabinet frame 20.

At step 320 the refrigeration component(s) 60, 70 is installed in the selected position. Installing the refrigeration component(s) 60, 70 in the selected position may comprise attaching it at the selected position via fasteners or the like.

In the event that the selected position is the base portion of the cabinet frame 20, the refrigeration component(s) 60, 70 is installed in the base plate 40 of the cabinet frame 20 via the mounting points in the base plate 40 and a wall 90 is installed at the rear portion via mounting points in the rear structure 50.

In the event that the selected position is the rear portion of the cabinet frame 20, the refrigeration component(s) 60, 70 is installed to a rear housing 95 via mounting points thereon and the rear housing 95 along with the refrigeration component(s) 60, 70 is installed at the mounting points at the rear structure 50 of the cabinet frame 20. In that case, the refrigeration component(s) 60, 70 is preassembled in the rear housing 95 and therefore installing the rear housing 95 at the rear structure 50 therefore installs the refrigeration component(s) 60, 70 at the rear portion of the cabinet frame 20.

Alternatively, the rear housing 95 may be installed at the mounting points at the rear structure 50 of the cabinet frame 20 and the refrigeration component(s) 60, 70 may be then installed on mounting points of the rear housing 95 to install the refrigeration components at the rear portion of the cabinet frame 20.

The invention therefore uses the same design of cabinet frame 20 for manufacturing different types of display cabinets 10, since the cabinet frame 20 is suitable for either type of display cabinet 10. It is therefore possible improve manufacturing efficiency by reducing the number of components needed to manufacture multiple display cabinets.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description but is only limited by the scope of the appended claims.

The invention claimed is:

1. A method of manufacturing a display cabinet for a refrigerated display, comprising:
    assembling a cabinet frame including a rear portion and a base portion, wherein each of the base and rear portions is configured to have a refrigeration component;
    establishing a priority of either a minimized intended floor projection of the display cabinet or a maximized intended refrigerated display volume of the display cabinet;
    upon selecting the priority of the minimized intended floor projection of the display cabinet, selecting the base portion of the cabinet frame as the selected portion;
    upon selecting the priority of the maximized intended refrigerated display volume of the display cabinet is selected, selecting the rear portion of the cabinet frame as the selected portion;
    and
    installing the refrigeration component in at least the selected portion.

2. The method of claim 1, wherein installing the refrigeration component in the selected position comprises installing a refrigeration unit as a modular unit.

3. The method of claim 1, comprising installing a plurality of refrigeration components in the selected rear or base portion.

4. The method of claim 1, comprising selecting the rear portion of the cabinet frame for installation of the refrigeration component, and attaching a rear housing to the cabinet frame, for housing the refrigeration component.

5. The method of claim 4, comprising mounting the refrigeration component within the rear housing prior to attaching the rear housing to the cabinet frame, to thereby install the refrigeration component by attachment of the rear housing.

6. The method of claim 1, comprising selecting the base portion of the cabinet frame for installation of the refrigeration component, and attaching the refrigeration component to a base plate of the cabinet frame.

7. The method of claim 6, comprising installing a wall at the rear portion of the cabinet frame.

8. The method of claim 1, wherein the cabinet frame is a first cabinet frame, and the refrigeration component is a first refrigeration component, the method comprising:
    assembling a second cabinet frame to the same design as the first cabinet frame, the second cabinet frame being configured to have a second refrigeration component installed at either a rear portion or a base portion of the second cabinet frame;
    selecting from both the rear portion and the base portion of the second cabinet frame the portion not selected for the first cabinet frame for installation of the first refrigeration component; and installing the second refrigeration component in the second cabinet frame in the selected portion.

* * * * *